United States Patent
Eo et al.

(10) Patent No.: US 9,876,467 B2
(45) Date of Patent: Jan. 23, 2018

(54) WIRING STRUCTURE FOR SOLAR CELL ROOF

(71) Applicant: Hyundai Motor Company, Seoul (KR)

(72) Inventors: Moon-Jung Eo, Suwon-si (KR); Mi-Yeon Song, Seoul (KR); Hoo-Sang Park, Hwaseong-si (KR); Sang-Hak Kim, Seoul (KR); Sol Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 118 days.

(21) Appl. No.: 14/855,874

(22) Filed: Sep. 16, 2015

(65) Prior Publication Data
US 2016/0248371 A1    Aug. 25, 2016

(30) Foreign Application Priority Data
Feb. 23, 2015  (KR) .................. 10-2015-0024978

(51) Int. Cl.
| | |
|---|---|
| B60J 7/02 | (2006.01) |
| H02S 40/36 | (2014.01) |
| H02S 20/30 | (2014.01) |
| B60R 16/027 | (2006.01) |
| B60J 7/04 | (2006.01) |

(52) U.S. Cl.
CPC .......... *H02S 40/36* (2014.12); *B60J 7/04* (2013.01); *B60R 16/027* (2013.01); *H02S 20/30* (2014.12); *Y02T 10/88* (2013.01); *Y02T 10/90* (2013.01)

(58) Field of Classification Search
CPC ...... B60R 16/027; B60R 16/0207; B60J 7/04; H02S 40/36

USPC ............... 296/211, 216.01–224; 59/78.1; 174/68.3; 136/251, 291
See application file for complete search history.

(56) References Cited

U.S. PATENT DOCUMENTS

| | | | | |
|---|---|---|---|---|
| 6,036,259 A | * | 3/2000 | Hertel | ......... B60J 7/0573 174/117 F |
| 6,308,823 B1 | * | 10/2001 | Stevens | ......... B65G 17/065 198/790 |

(Continued)

FOREIGN PATENT DOCUMENTS

| | | |
|---|---|---|
| JP | 3356754 B2 | 12/2002 |
| JP | 2007-135299 A | 5/2007 |

(Continued)

*Primary Examiner* — Dennis H Pedder
(74) *Attorney, Agent, or Firm* — Morgan Lewis & Bockius LLP (57) ABSTRACT

A wiring structure for a solar cell roof may include a moving glass slidably provided on a mechanism rail mounted on each of side frames that are disposed on both sides of a ceiling opening of a vehicle, and a fixed glass fixedly provided, a connection wire connected at a first end thereof to a solar cell included in the moving glass and connected at a second end thereof to a solar cell included in the fixed glass to allow electric current to flow therethrough, and a guide device provided on the side frame adjacent to the mechanism rail to be disposed in a longitudinal direction of the vehicle, and having a space to accommodate the connection wire therein, in which, when the moving glass is opened, the guide device accommodating the connection wire is restrained in movement in a transverse direction of the vehicle but is rotated only upwards.

6 Claims, 5 Drawing Sheets

(56) References Cited

U.S. PATENT DOCUMENTS

| | | | | |
|---|---|---|---|---|
| 6,615,573 | B2 * | 9/2003 | Blase | F16G 13/16 |
| | | | | 248/49 |
| 8,348,336 | B2 * | 1/2013 | De Bie | B60J 7/0084 |
| | | | | 136/291 |
| 8,987,599 | B2 * | 3/2015 | Reuss | H02G 3/0487 |
| | | | | 174/113 R |
| 2005/0198937 | A1 | 9/2005 | Komiya | |
| 2013/0212997 | A1 | 8/2013 | Komiya | |

FOREIGN PATENT DOCUMENTS

| | | |
|---|---|---|
| JP | 2009-60731 A | 3/2009 |
| KR | 20-0292295 Y1 | 10/2002 |
| KR | 10-0727362 B1 | 6/2007 |
| KR | 10-0909615 B1 | 7/2009 |
| KR | 10-2014-0026064 A | 3/2014 |

\* cited by examiner

WIRING STRUCTURE FOR SOLAR CELL ROOF

CROSS-REFERENCE TO RELATED APPLICATION

The present application claims priority to Korean Patent Application No. 10-2015-0024978 filed Feb. 23, 2015, the entire contents of which is incorporated herein for all purposes by this reference.

BACKGROUND OF THE INVENTION

Field of the Invention

The present invention relates to a wire connecting structure for a sunroof including a solar cell. More particularly, the present invention relates to a wiring structure for a solar cell roof, which is configured such that a connection wire connecting solar cells provided in a moving glass and a fixed glass is accommodated in a guide device, thus preventing the twisting or interference of the connection wire and preventing the connection wire from being exposed to water.

Description of Related Art

An opening may be formed on a roof panel of a vehicle to let indoor air be discharged out from the vehicle or let outdoor air enter the vehicle, the opening being opened or closed by a sunroof glass.

Recently, in order to afford an unhampered feeling and an excellent aesthetic effect in terms of design, a panoramic sunroof is widely used, in which most of the roof panel of the vehicle is made of glass and a part of the roof panel is selectively opened or closed.

Such a sunroof is made to ventilate a vehicle and provide an unhampered feeling, and is manufactured through heat treatment to withstand strong sunlight. The sunroof may be made of a glass material that effectively blocks ultraviolet light and infrared light, or may be made of a high strength material to prevent a passenger from being injured by pieces of broken glass in the event of an accident.

Meanwhile, recently, in order to solve the depletion of fossil fuel due to the shortage of energy resources and to minimize air pollution, research into the usage of solar energy as an auxiliary power supply device of the vehicle is actively carried out. Actually, some of hybrid electric vehicles, electric vehicles or luxury vehicles which optionally have silicone solar cell panels on a ceiling of a vehicle body, the vehicle body, a dashboard or the like come to the market.

As means for converting the solar energy into electric energy, technology using the solar cell is widely known. Technology for mounting the solar cell to parts of the vehicle that may receive a largest amount of solar energy, that is, the roof panel or the sunroof glass (moving glass and fixed glass) is mainly proposed.

However, a conventional sunroof for a vehicle using a solar cell is configured such that electricity produced from the solar cell attached to or included in the sunroof glass is directly transmitted through the moving glass and the fixed glass, and is problematic in that the movement of the sunroof glass is extremely limited.

That is, generally, the moving glass freely slides forwards and rearwards on the ceiling of the vehicle to open or close the opening. However, the conventional sunroof is problematic in that a junction between the moving glass and the fixed glass does not perfectly receive the movement of the moving glass, so that the solar cell may not be utilized 100%, or the movement of the moving glass should be extremely limited so as to completely use the solar cell.

Further, if electric energy produced from the solar cell is transmitted simply through the wire from the moving glass to the fixed glass, the repeated movement of the moving glass undesirably causes the twisting or interference of the wire and thereby leads to the wear of the wire.

Moreover, research into the conventional sunroof for the vehicle using the solar cell is mainly focused on the solar cell panel itself, namely, the material, properties, arrangement, and application of the solar cell. Research into the wiring structure for transmitting the electric energy produced from the solar cell is very insufficient.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a wiring structure for a solar cell roof, which uses a guide device that is restrained in a movement in a transverse direction of a vehicle and is rotatable only in a vertical direction, thus preventing the twisting or interference of a connection wire.

Various aspects of the present invention are directed to providing a wiring structure for a solar cell roof, which prevents a guide device from being removed through a fixing pin and a fixing hole, and prevents water from flowing into a connection wire by using a waterproof member or the like.

According to various aspects of the present invention, a wiring structure for a solar cell roof may include a moving glass slidably provided on a mechanism rail mounted on each of side frames that are disposed on both sides of a ceiling opening of a vehicle, and a fixed glass fixedly provided, a connection wire connected at a first end thereof to a solar cell included in the moving glass and connected at a second end thereof to a solar cell included in the fixed glass to allow electric current to flow therethrough, and a guide device provided on the side frame adjacent to the mechanism rail to be disposed in a longitudinal direction of the vehicle, and having a space to accommodate the connection wire therein, in which, when the moving glass is opened, the guide device accommodating the connection wire may be restrained in movement in a transverse direction of the vehicle but rotated only upwards.

The guide device may include a plurality of body portions arranged in a row in the longitudinal direction of the vehicle, each of the body portions having therein an inserting portion to allow the connection wire to be inserted, and a plurality of rotary pins rotatably connecting the body portions to each other.

The wiring structure may further include an 'L'-shaped connector coupled at a first side thereof to a front end of the guide device, and coupled at a second side thereof to the solar cell of the moving glass, and a mounting portion coupled to a rear end of the guide device, and fixedly coupled at a lower end thereof to the side frame.

The wiring structure may further include a plurality of fixing pins provided on a lower portion of the guide device, and spaced apart from each other at a predetermined interval in such a way as to protrude downwards, and a plurality of fixing holes penetrated through the side frame to correspond to positions of the fixing pins, in which, when the moving glass is opened, each of the fixing pins may be inserted into the corresponding fixing hole, thus preventing removal of the guide device.

The wiring structure may further include a plurality of anti-noise members attached to a lower portion of the guide device and spaced apart from each other at a predetermined interval, in which each of the anti-noise members may be in contact with an upper surface of the side frame, thus preventing frictional noise between the guide device and the side frame and preventing the side frame from being worn out.

The wiring structure may further include a plurality of fixing pins provided on a lower portion of the guide device, and spaced apart from each other at a predetermined interval in such a way as to protrude downwards, a plurality of fixing holes penetrated through the side frame to correspond to positions of the fixing pins, and a plurality of anti-noise members attached to the lower portion of the guide device and spaced apart from each other at a predetermined interval, in which the plurality of fixing pins and the plurality of anti-noise members may be alternately arranged.

The wiring structure may further include a waterproof member provided between an inner surface of each of the body portions and the inserting portion to surround the connection wire, in which the waterproof member may prevent water from flowing into the connection wire, and prevent the connection wire from being worn out due to repeated movements.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
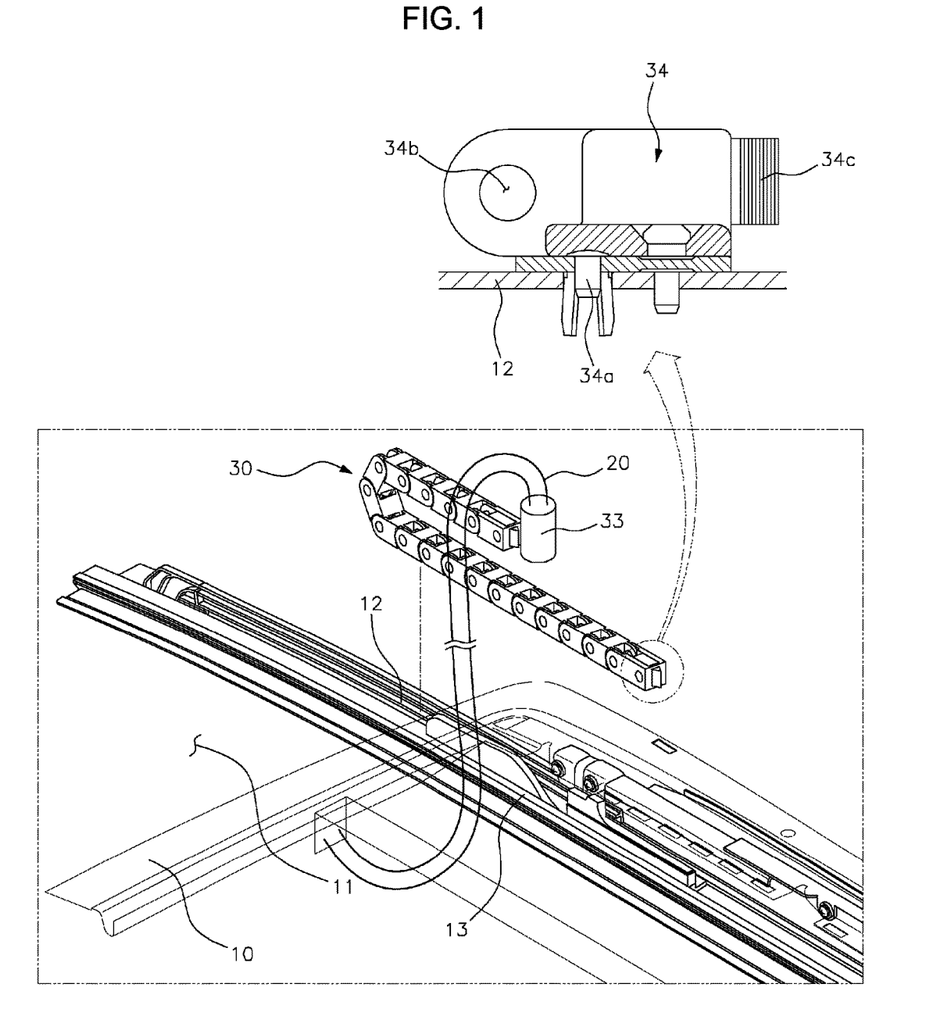
FIG. 1 is an assembled perspective view illustrating an exemplary wiring structure for a solar cell roof according to the present invention.
Figure 2A:
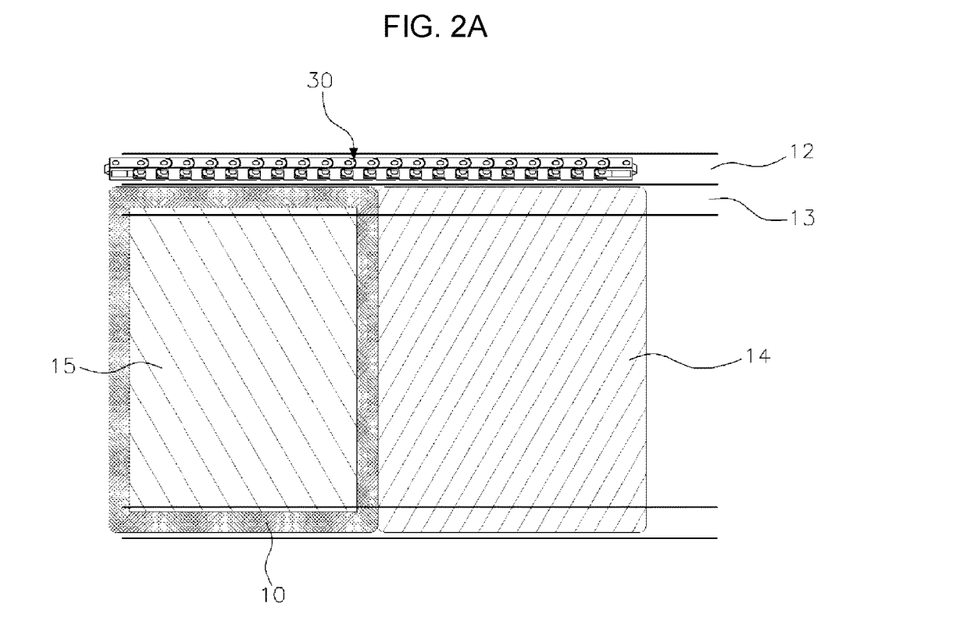
FIG. 2A is a view schematically illustrating the exemplary wiring structure for the solar cell roof according to the present invention when a moving glass is closed.
Figure 2B:
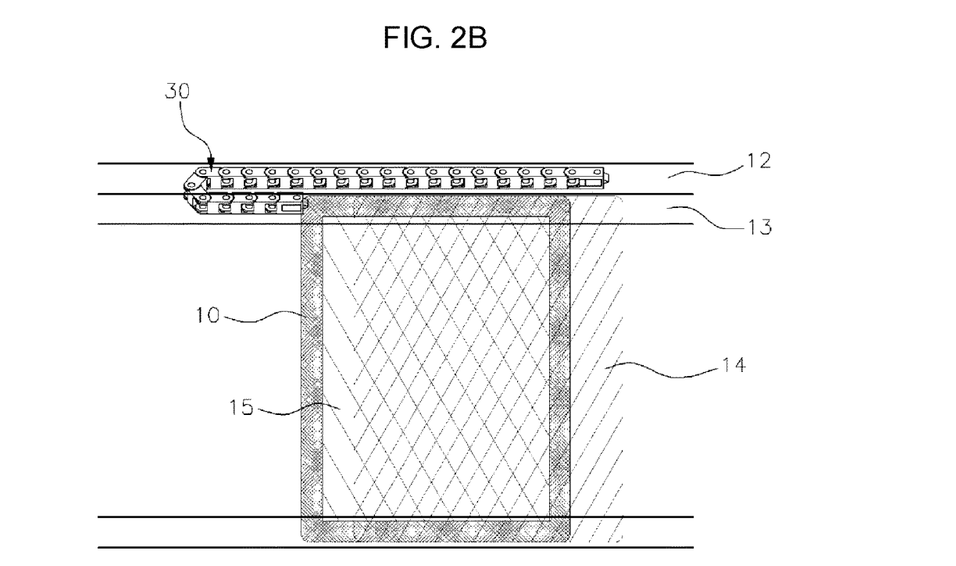
FIG. 2B is a view schematically illustrating the exemplary wiring structure for the solar cell roof according to the present invention when the moving glass is opened.
Figure 3A:
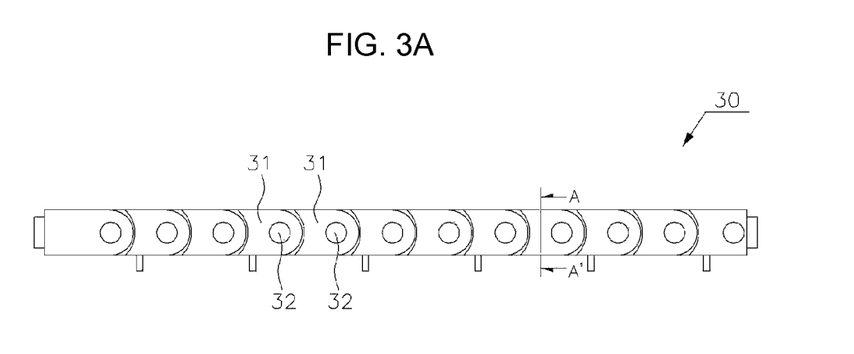
FIG. 3A and FIG. 3B are a side view and a perspective view illustrating a guide device according to the present invention, respectively.
Figure 3B:
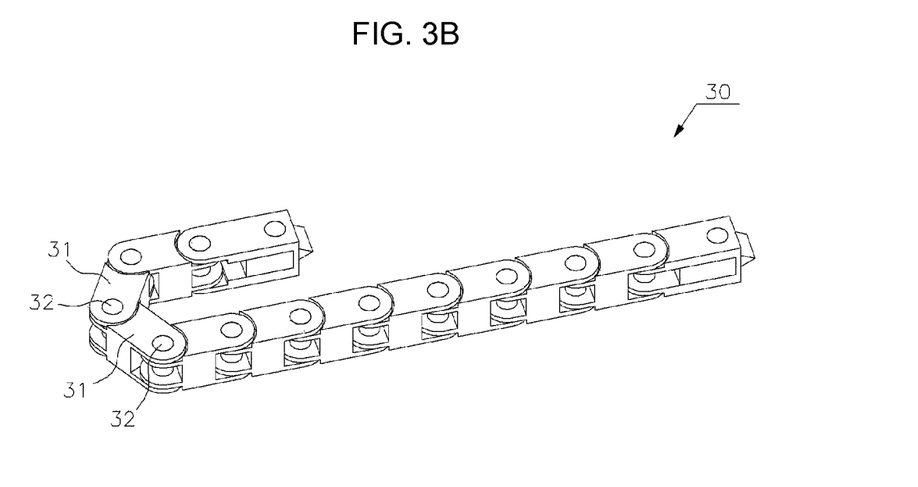

FIG. 1 is an assembled perspective view illustrating a wiring structure for a solar cell roof according to various embodiments of the present invention, FIG. 2A is a view schematically illustrating the wiring structure for the solar cell roof according to various embodiments of the present invention when a moving glass is closed, FIG. 2B is a view schematically illustrating the wiring structure for the solar cell roof according to various embodiments of the present invention when the moving glass is opened, and FIG. 3A and FIG. 3B are a side view and a perspective view illustrating a guide device according to various embodiments of the present invention, respectively.

As shown in the drawings, a moving glass 10 is provided on a front region of a ceiling of a vehicle in such a way as to slide forwards and rearwards, and a rear glass (not shown) is secured to a rear region of the ceiling of the vehicle.

The moving glass 10 is slidably provided on a mechanism rail 13 mounted on each of side frames 12 which are disposed on both sides of the ceiling opening 11, and serves to open or close the ceiling opening 11, thus affording an unhampered feeling.

The moving glass 10 is slid using a drive device such as a drive motor or a cable. Since a specific description of the operating method is disclosed in various documents, a detailed description thereof will be omitted herein.

The moving glass 10 and a fixed glass are usually made of a material for effectively blocking ultraviolet light and infrared light, and may be formed of various materials, such as a transparent material, an opaque material, or synthetic resin.

Further, recently, a solar cell 15 is provided on each of the moving glass 10 and the fixed glass 14 to convert solar energy into electric energy, and then is used in various parts (e.g., BCM, blower fan, battery, or the like) of the vehicle requiring electricity.

As such a solar cell, a semiconductor device using photoelectric effect is mainly used. The solar cell may be provided in whole or in part on each of the moving glass 10 and the fixed glass, or each of the moving glass and the fixed glass itself may comprise a transparent or translucent solar cell.

After the electric energy produced from the solar cell of the moving glass 10 is transmitted to the fixed glass via the connection wire 20 which is connected at one end thereof to the moving glass 10 and connected at the other end to the fixed glass, the electric energy is transmitted to each component of the vehicle. In this connection, while the moving glass is repeatedly moved, the twisting or interference of the connection wire may occur.

Thus, the present invention prevents the twisting or interference of the connection wire using the guide device 30 configured to surround the connection wire 20, and allows the electric energy produced from the moving glass 10 to be always stably supplied.

The guide device 30 is disposed on the side frame 12 adjacent to the mechanism rail 13, that is, disposed in a longitudinal direction of the vehicle between the mechanism rail 13 and the roof frame. The guide device 30 is configured to be moved only in the vertical direction as the moving glass 10 is moved.

That is, when the moving glass 10 is opened, the guide device 30 accommodating the connection wire is not moved in the transverse direction of the vehicle but is rotated only upwards. Thereby, since the connection wire 20 is always moved along a given course, the twisting or interference of the connection wire 20 does not occur.

Specifically, as shown in FIG. 3A and FIG. 3B, the guide device 30 includes a plurality of body portions 31 and a plurality of rotary pins 32. The body portions 31 are arranged in a row in the longitudinal direction of the vehicle, each body portion 31 having therein an inserting portion (see reference numeral 31a of FIG. 7) to allow the connection wire 20 to be inserted. The rotary pins 32 rotatably connect the body portions 31 to each other to allow the body portions 31 to be rotated.

FIG. 3A is a side view illustrating the guide device 30 when the moving glass is closed, and FIG. 3B is a perspective view illustrating the guide device 30 when the moving glass is opened.

As shown in the drawings, the rotary pins 32 are arranged across the body portions 31, namely, in the transverse direction of the vehicle to connect the body portions 31 to each other. It is to be understood by those skilled in the art that the guide device 30 is movable only in the vertical direction.

Further, an 'L'-shaped connector 33 is provided on a front end of the guide device 30, and is coupled at one side thereof to the guide device 30 and at the other side thereof to the solar cell of the moving glass 10. A mounting portion 34 is provided on a rear end of the guide device 30, and is fixedly coupled at a lower end thereof to the side frame 12.

As described above, the guide device 30 should maintain the same direction as the mechanism rail 13 while being arranged adjacent to the mechanism rail 13. To this end, the guide device 30 is connected to the moving glass 10 to be always parallel to the mechanism rail 13 via the 'L'-shaped connector 33 coupled to the front end of the guide device 30.

The term used herein "parallel" is not limited to a mathematically parallel state, but, as long as objects projected by A and B are approximately parallel to each other when they are seen with the naked eyes, it is applicable to various embodiments of the present invention.

As shown in FIG. 1, the mounting portion 34 is fixedly coupled at a lower end thereof to the side frame 12 by a clamping device 34a. A through hole 34b is formed on one side (left side in the illustrated embodiments) of the mounting portion 34 to allow another body portion 31 of the guide device 30 to be rotatably coupled thereto. A rear connecting portion 34c is formed on the other side (right side in the illustrated embodiments) of the mounting portion 34 to be connected to the solar cell of the fixed glass.

Since the rear end of the guide device 30 is fixed by the mounting portion 34, the guide device 30 is naturally rotated upwards when the moving glass 10 is opened to thereby follow the movement of the moving glass 10.

Figure 4:
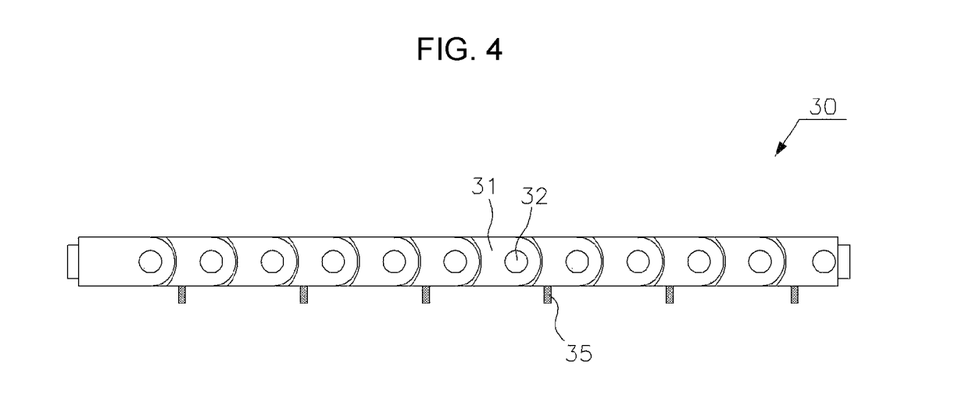
FIG. 4 is a side view illustrating a guide device according to the present invention.
Figure 5:
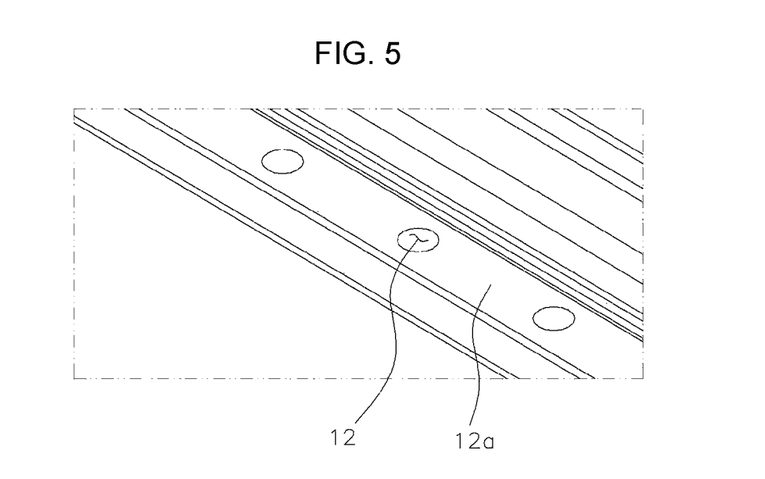
FIG. 5 is a perspective view partially illustrating a side frame according to the present invention.

FIG. 4 is a side view illustrating a guide device according to various embodiments of the present invention, and FIG. 5 is a perspective view partially illustrating a side frame according to various embodiments of the present invention.

As shown in FIG. 4, the guide device 30 according to various embodiments of the present invention preferably has on a lower portion thereof a plurality of fixing pins 35 which are spaced apart from each other at a predetermined interval in such a way as to protrude downwards.

Further, as shown in FIG. 5, the side frame 12 according to various embodiments of the present invention preferably has a plurality of fixing holes 12a that are penetrated through the side frame 12 in such a way as to correspond to the positions of the fixing pins 35.

As described above, the guide device 30 according to the present invention is restrained in a movement in a direction from left to right (transverse direction) but is rotatable only in the vertical direction. In this case, if the vehicle body is severely shaken or the moving glass is excessively frequently moved, the whole guide device 30 may deviate from a given course.

Therefore, the plurality of fixing pins 35 is formed on the lower portion of the guide device 30 and the plurality of fixing holes 12a is formed in the side frame 12 to correspond to the fixing pins 35, thus preventing the whole guide device 30 from deviating from the given course.

When the moving glass 10 is closed, all of the fixing pins 35 are inserted into the fixing holes 12a. As the moving glass 10 is gradually opened, the fixing pins 35 are sequentially removed from the fixing holes 12a. Again, if the moving glass 10 is closed, the fixing pins 35 are inserted into the fixing holes 12a in reverse order.

The fixing pins 35 are preferably made of rubber or non-woven fabric. This maximally prevents noise from being generated when the fixing pins 35 repeatedly moved by the movement of the moving glass 10 collide with the fixing holes 12a.

Figure 6:
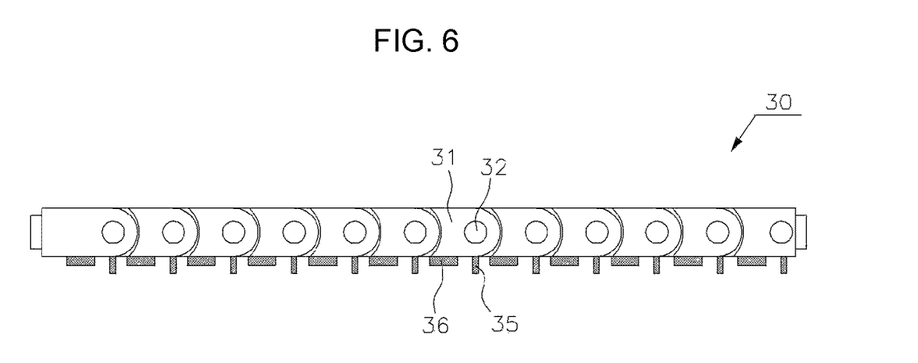
FIG. 6 is a side view illustrating a guide device according to the present invention.
Figure 7:
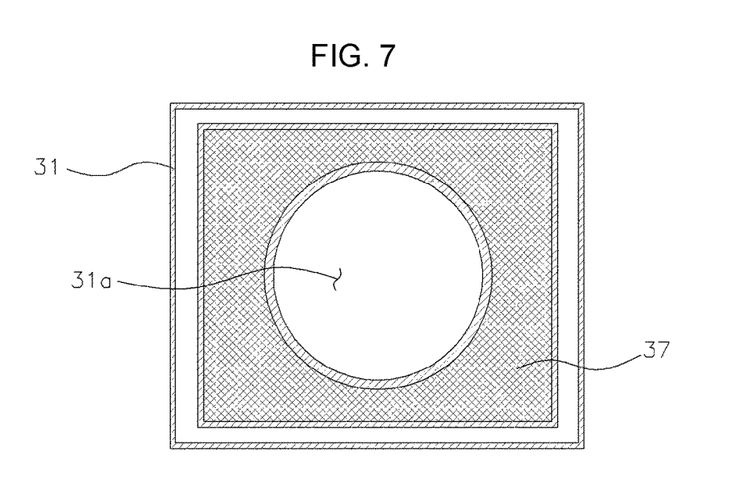
FIG. 7 is a sectional view taken along line A-A' of FIG. 3A.

FIG. 6 is a side view illustrating a guide device according to a various embodiments of the present invention, and FIG. 7 is a sectional view taken along line A-A' of FIG. 3.

As shown in FIG. 6, the guide device 30 according to various embodiments of the present invention preferably has on a lower portion thereof a plurality of anti-noise members 36 which are attached thereto in such a way as to be spaced apart from each other at a predetermined interval.

As the moving glass 10 is moved, the guide device 30 is repeatedly in contact with or spaced apart from the upper surface of the side frame 12. Thereby, frictional noise may be continuously generated and the side frame may be inevitably worn out.

Therefore, the anti-noise members 36, made of a material which is capable of preventing noise in addition to having a waterproofing function and a wear-resistant function, for example, low-friction film, rubber, non-woven fabric or silicone, are attached to the lower portion of the guide device 30, thus preventing noise and abrasion.

In this regard, the anti-noise member 36 may be coupled to the lower portion of the guide device 30 together with the above-described fixing pins 35. Preferably, the plurality of fixing pins 35 and the plurality of anti-noise members 36 may be alternately arranged.

As in the illustrated various embodiments, one fixing pin 35 and one anti-noise member 36 are arranged with respect to one body portion 31. The fixing pin 35 and the anti-noise member 36 are preferably arranged in the order of "fixing pin-anti-noise member-fixing pin-anti-noise member".

As shown in FIG. 7, a waterproof member 37 is preferably coupled between the inner surface of the body portion 31 and the inserting portion 31a, that is, coupled to a remaining part except a part of the body portion into which the connection wire is inserted, in such a way as to surround the connection wire 20.

With the lapse of time, the connection wire 20 accommodated in the guide device 30 may be gradually worn out. Thereby, if water introduced into the guide device 30 comes into contact with a part of the connection wire having no sheath, this leads to a dangerous accident such as an electric shock.

Therefore, the connection wire 20 is completely surrounded by the waterproof member 37 made of a wear-resistant material, such as rubber or silicone, thus preventing water from flowing into the connection wire and preventing the connection wire from being worn out.

As described above, the present invention solves the problems found in the prior art, thus allowing the connection wire 20 to always move along a given course of the guide device 30, and thereby preventing the twisting or interference of the connection wire 20 and stably supplying electric energy produced from the moving glass to the fixed glass.

As described above, the present invention is configured to surround the connection wire connecting the moving glass and the fixed glass using the guide device, thus allowing the connection wire to always move along a given course regardless of the repeated movement of the moving glass.

That is, the present invention essentially prevents the twisting or interference of the connection wire due to the repeated movement of the moving glass including the solar cell, thus allowing electric current to always stably flow between the moving glass and the fixed glass.

Further, the present invention allows the guide device to be formed as the chain structure using the body portion and the rotary pin, so that the guide device may be rotated only in the vertical direction but may not be moved in the transverse direction when the moving glass is moved.

Furthermore, the present invention is configured such that the fixing pin is coupled to the lower portion of the guide device and the fixing hole is formed in the side frame, thus allowing the guide device to be moved without being dislodged from its course as the moving glass is moved.

In addition, the present invention allows the anti-noise member to be attached to the lower portion of the guide device, thus preventing the side frame from being worn out due to continuous friction between the side frame and the guide device when it is moved, in addition to preventing noise from being generated.

Moreover, the present invention is configured such that the waterproof member is inserted into the body portion to surround the connection wire, thus preventing the connection wire from being worn out and preventing the inflow of water, and thereby preventing the connection wire from causing an electric shock.

As a result, the present invention is capable of stably supplying the electric energy produced from the moving glass which needs to be continuously moved, and is capable of remarkably reducing the risk of small failures or electric shocks, thus increasing the marketability of the vehicle.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wiring structure for a solar cell roof comprising:
   a moving glass slidably provided on a mechanism rail mounted on each of side frames that are disposed on both sides of a ceiling opening of a vehicle, and a fixed glass fixedly provided;
   a connection wire connected at a first end thereof to a guide device and connected at a second end thereof to a solar cell of the moving glass to allow electric current to flow therethrough;
   the guide device provided on the side frame adjacent to the mechanism rail to be disposed in a longitudinal direction of the vehicle, and having a space to accommodate the connection wire therein,
   wherein, when the moving glass is opened, the guide device accommodating the connection wire is restrained in movement in a transverse direction of the vehicle but is rotated only upwards;
   a plurality of fixing pins provided on a lower portion of the guide device, and spaced apart from each other at a predetermined interval in such a way as to protrude downwards; and
   a plurality of fixing holes penetrated through the side frame to correspond to positions of the fixing pins,
   wherein, when the moving glass is opened, each of the fixing pins is inserted into the corresponding fixing hole, thus preventing removal of the guide device.

2. The wiring structure of claim 1, wherein the guide device comprises:
   a plurality of body portions arranged in a row in the longitudinal direction of the vehicle, each of the body portions having therein an inserting portion to allow the connection wire to be inserted; and
   a plurality of rotary pins rotatably connecting the body portions to each other.

3. The wiring structure of claim 1, further comprising:
   an 'L'-shaped connector coupled at a first side thereof to a front end of the guide device, and coupled at a second side thereof to the solar cell of the moving glass; and
   a mounting portion coupled to a rear end of the guide device, and fixedly coupled at a lower end thereof to the side frame.

4. The wiring structure of claim 1, further comprising:
a plurality of anti-noise members attached to a lower portion of the guide device and spaced apart from each other at a predetermined interval,
wherein each of the anti-noise members is in contact with an upper surface of the side frame, thus preventing frictional noise between the guide device and the side frame and preventing the side frame from being worn out.

5. The wiring structure of claim 1, further comprising:
a plurality of anti-noise members attached to the lower portion of the guide device and spaced apart from each other at a predetermined interval,
wherein the plurality of fixing pins and the plurality of anti-noise members are alternately arranged.

6. The wiring structure of claim 2, further comprising:
a waterproof member provided between an inner surface of each of the body portions and the inserting portion to surround the connection wire,
wherein the waterproof member prevents water from flowing into the connection wire, and prevents the connection wire from being worn out due to repeated movements.

\* \* \* \* \*